(12) United States Patent
Cirulli et al.

(10) Patent No.: US 7,386,495 B2
(45) Date of Patent: Jun. 10, 2008

(54) SYSTEM AND METHOD FOR PROCESSING TAX CODES BY COMPANY GROUP

(75) Inventors: Susan Bumgardner Cirulli, Endicott, NY (US); Robert Martin Evans, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 1623 days.

(21) Appl. No.: 09/816,264

(22) Filed: Mar. 23, 2001

(65) Prior Publication Data

US 2002/0184125 A1    Dec. 5, 2002

(51) Int. Cl.
*G06Q 40/00* (2006.01)

(52) U.S. Cl. .......................... 705/36 T; 705/36; 705/35

(58) Field of Classification Search ............... 705/31, 705/19, 36 T, 35, 36
See application file for complete search history.

(56) References Cited

U.S. PATENT DOCUMENTS 6,047,268 A * 4/2000 Bartoli et al. ................. 705/35

OTHER PUBLICATIONS

USBI bill dated Jul. 22, 1998. two web site pages with background on USBI (www.billview.com and www.billing concepts.com).*

* cited by examiner

*Primary Examiner*—James Kramer
*Assistant Examiner*—Kirsten Apple
(74) *Attorney, Agent, or Firm*—Willliam E. Schiesser; Shelley M Beckstrand

(57) ABSTRACT

A system and method for assigning taxability codes to purchases, and processing tax invoices, by company groups. A user, identified to one of a group of companies, inputs a requisition. Tax code and tax location are identified in a front end process applicable to the object of the requisition and converted into a converted tax code and tax jurisdiction and fed to a back end processor. Responsive to converted tax code and the tax jurisdiction for the corresponding company group, the back end prepares a purchase order which is transmitted to a supplier. Responsive to an invoice from the supplier and company group and tax code indicia from the purchase order, the back end processes and selectively pays, short pays, or rejects the invoice.

12 Claims, 14 Drawing Sheets

| ITEM OPTIONS | |
|---|---|
| TAX INFORMATION | |
| * Tax Indicator Code: | Non-Taxable – Resale ▼ |
| * Tax Location code: | TN(44DA)-651 Heil-Quaker Ave. – Lewisburg ▼ |
| ITEM OPTIONS | |
| * Need By | 3/23/2001 |
| * Expedite/Emergency | NO ▼ |

FIG. 8

| ITEM OPTIONS |
| --- |
| TAX INFORMATION    * Tax Indicator Code    Taxable ▼ <br><br> Taxable <br> Taxable Reduced Rate Mach/ Equip NC Only <br> Nontaxable— Resale <br> Nontaxable— Manufacturing <br> Nontaxable— Research and Development <br> Nontaxable— Capital Improvement <br> Nontaxable— Service <br> Nontaxable— Other |

FIG. 9

| ITEM OPTIONS |
|---|

TAX INFORMATION
 * Tax Location Code    TN (44DA)-651 Heil-Quaker Ave. — Lewisburg ▼
                        —Select from list—
                        TN(44DA)-651 Heil-Quaker Ave.-Lewisburg
                        TN(44DB)1621 Heil-Quaker Ave.-Lavergne

FIG. 10

```
CHANGE PURCHASE ORDER:  ITEM 00002
Purchase  Order  Edit  Header  Item  Environment  System  Help
Item         4600000695   Item Cat.    2      AcctAssCat   N
Material                  Mat'l Group  S09    Plant        CF01
Description  text                             Stor. Loc Qty and Price
   Order quantity    1          UL              Info rec. update ☐
   Net Order Price   1,000.00   USD $   1  UL   ☐ Estimated Price
   Qty. Conversion   1          UL <->  1  UL   ✓ Print price Deadline Monitoring
   Delivery Date   T 01/12/2000    Reminder 1
   Stat. del. date   01/12/2000    Reminder 2
                                   Reminder 3

Acknow. no.
   Tracking no.    BOB
   ConfContrk                  ☐ Ackn. reqd.
   Vend. mat.

GR proc. Time

GR/IR control
   Underdel. tol.         %      ☐ Qual. insp.
   Overdel. tol.          %      ☐ Del. compl.
   Tax Code       I 1            ☐ Final inv.
   Shipping Inst
```

ENTER INVOICE : INDIVIDUAL PURCHASE ORDER ITEM

LINE ITEM 002

AMOUNT  1,000.00  USD

TAX CODE  I 1
TAX JURIS.CD.  331000000

ITEM DATA

| | | | | |
|---|---|---|---|---|
| MATERIAL | | ACCT ASS CAT | N | |
| PLANT | CF01 | ORDERED | | 1 |
| PURCH.DOC | 4600000695 | DELIVERED | | 0 |
| | 00002  01 | INVOICED | | 0 |
| QUANTITY | 1  UL | NET PRICE | 1,000.00 USD 1 | UL |

CONTROL

SUB. DEB./CRED. ☐

ALLOCATION ☐          MAN.BLOCK . REASN ☐
                      FINAL INVOICE     ☐
TEXT ☐

FIG. 13

SYSTEM AND METHOD FOR PROCESSING TAX CODES BY COMPANY GROUP

CROSS REFERENCES TO RELATED APPLICATIONS

The following U.S. patent applications, filed concurrently or otherwise copending, are assigned to the assignee hereof and contain subject matter related, in certain respect, to the subject matter of the present application.

Ser No. 09/657,215, filed Sep. 7, 2000, entitled "System and Method for Clustering Servers for Performance and Load Balancing";

Ser. No. 09/657,216, filed Sep. 7, 2000, entitled "System and Method for Front End Business Logic and Validation";

Ser. No. 09/657,217, filed Sep. 7, 2000, entitled "System and Method for Data Transfer With Respect to External Applications";

Ser. No. 09/655,037, filed Sep. 7, 2000, entitled "System and Method for Providing a Relational Database Backend";

Ser. No. 09/656,803, filed Sep. 7, 2000, entitled "System and Method for Providing a Role Table GUI via Company Group";

Ser. No. 09/656,967, filed Sep. 7, 2000, entitled "System and Method for Populating HTML Forms Using Relational Database Agents";

Ser. No. 09/657,196, filed Sep. 7, 2000, entitled "System and Method for Catalog Administration Using Supplier Provided Flat Files";

Ser. No. 09/657,195, filed Sep. 7, 2000, entitled "System and Method for Providing an Application Navigator Client Menu Side Bar";

Ser. No. 09/819,462, entitled "SYSTEM AND METHOD FOR AUTOMATING INVOICE PROCESSING WITH POSITIVE CONFIRMATION";

Ser. No. 09/815,318, entitled "SYSTEM AND METHOD FOR GENERATING A COMPANY GROUP USER PROFILE";

Ser. No. 09/819,437, entitled "SYSTEM AND METHOD FOR SHARING DATA ACROSS FRAMES USING ENVIRONMENT VARIABLES";

Ser. No. 09/815,317, entitled "SYSTEM AND METHOD FOR SYNCHRONIZING LEDGER ACCOUNTS BY COMPANY GROUP";

Ser. No. 09/815,320, entitled "SYSTEM AND METHOD FOR GROUPING COMPANIES ACCORDING TO ACCOUNTING SYSTEM OR RULES";

Ser. No. 09/815,316, entitled "SYSTEM AND METHOD FOR FRAME STORAGE OF EXECUTABLE CODE";

Ser. No. 09/815,313, entitled "SYSTEM AND METHOD FOR INVOICE IMAGING THROUGH NEGATIVE CONFIRMATION PROCESS";

Ser. No. 09/815,312, entitled "SYSTEM AND METHOD FOR LEVERAGING PROCUREMENT ACROSS COMPANIES AND COMPANY GROUPS"; and Ser. No. 09/798,598, filed Mar. 2, 2001, entitled "SYSTEM AND METHOD FOR MANAGING INTERNET TRADING NETWORKS".

BACKGROUND OF THE INVENTION

1. Technical Field of the Invention

This invention pertains to a system and method for processing tax codes by company group in a front-end processor to bridge to a back-end purchasing system.

2. Background Art

When companies purchase goods, there are certain requirements for taxation. Taxation requirements differ by county, city, state, country and other locales, creating processing problems in paying those taxes correctly. Most companies use tax packages to determine taxability, based on where the goods are shipped; however, this does not take into account items that are purchased for research purposes or government contracts, which are not taxable. In certain companies, the people ordering the goods know the taxability and the shipping information, and can determine the taxability at the time of the order, but they are not usually the ones who interface with the tax packages; this is usually left to the Accounts Payable area.

There is a need in the art to provide an automated process for assigning taxability codes to purchases by company groups, and to automatically adapt to those company groups the processing of tax payments.

There is a further need to provide in a front end for the assignment of taxability codes, to thereby reduce the amount of work required on a back end process for resolving tax issues.

It is an object of the invention to provide an improved system and method for processing tax payments.

It is a further object of the invention to provide a system and method for assigning taxability codes to purchases by company groups, and to automatically adapt to those company groups the processing of tax payments.

SUMMARY OF THE INVENTION

In accordance with the invention, there is provided a system and method for assigning taxability codes to purchases and processing tax invoices, the method including the steps of receiving from a user, identified by company indicia to one of a plurality of company groups, a purchase requisition for a service or commodity object; responsive to the indicia and object, determining in a front end process a tax code and tax location based on defined business rules; feeding the tax code and tax location code to a back end process; in the back end process, converting the tax code and tax location to a tax jurisdiction code with associated tax rate and preparing a purchase order identified to the appropriate company group for transmittal.

In accordance with an aspect of the invention, there is provided a computer program product configured to be operable to assigning taxability codes to purchases, and processing tax invoices, by company groups.

Other features and advantages of the invention will become apparent from the following detailed description of the presently preferred embodiment of the invention, taken in conjunction with the accompanying drawings.

BRIEF DESCRIPTION OF THE DRAWINGS

FIG. 8 is a representation of a screen panel display for users required to select tax code and location.

FIG. 9 is a representation of a screen panel expansion of the tax indicator code of FIG. 8.

FIG. 10 is a representation of a screen panel expansion of the tax location code of FIG. 8.

FIG. 11 illustrates a purchase order detail screen which shows tax code I1 which is a taxable code.

FIG. 12 illustrates a screen showing the tax jurisdiction code.

FIG. 13 illustrates an invoice verification screen showing a I1 tax code and tax jurisdiction code of 331000000 which have defaulted from the purchase order.

BEST MODE FOR CARRYING OUT THE INVENTION

In accordance with the preferred embodiments of the invention, a system and method are provided for identifying specific tax jurisdiction codes and appropriate tax indicator codes by company groups, in a front-end procurement system to bridge to a back-end purchasing system for appropriate processing. This provides a system and method for automatic the process of configuring tax processing across multiple companies and groups of associated companies.

Further in accordance with the invention, there is provided a system and method for assigning taxability codes to purchases, and processing tax invoices, by company groups at the time of placing the order. A user, identified to one of a group of companies, inputs a requisition. Depending upon the user's company group and business processes, the user may be required to select an appropriate tax code and tax location for the goods to be purchased, or have it assigned automatically. This capability is associated with individual line items, rather than the entire requisition. Certain companies may require the tax code to be assigned by a "tax approver," who reviews the requisition items and assigns tax codes as appropriate. Tax code and tax location are identified in a front end process applicable to the object of the requisition and converted into a converted tax code and tax jurisdiction and fed to a back end processor. Responsive to converted tax code and the tax jurisdiction for the corresponding company group, the back end prepares a purchase order which is transmitted to a supplier. Responsive to an invoice from the supplier and company group and tax code indicia from the purchase order, the back end processes and selectively pays, short pays, or rejects the invoice.

Referring to FIGS. 2 through 7, an exemplary embodiment illustrating three tax processing scenarios on behalf of three different company groups is presented. In the first scenario (FIGS. 2 and 3), a user creating a requisition is involved in selecting the taxability. In the second scenario (FIGS. 4 and 5), taxability is determined based on the commodity being purchased. And in the third scenario (FIGS. 6 and 7), taxability is determined based on the commodity being purchased and the purchasing ship to location. Which scenario is executed is determined by the company code assigned to the user creating the requisition.

Figure 1:
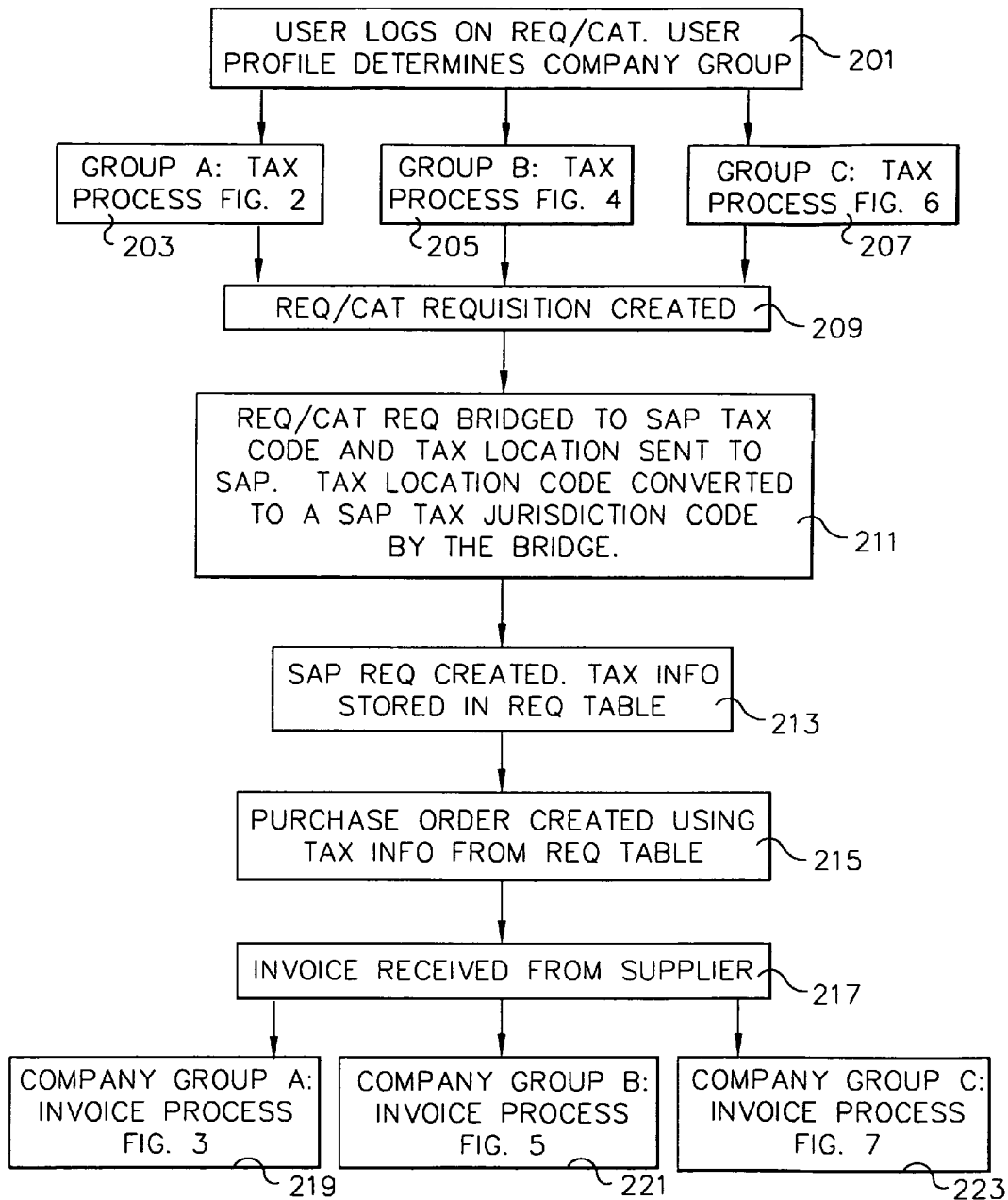
FIG. 1 is a high level system diagram illustrating taxability processing for a plurality of company groups in accordance with the preferred embodiment of the invention.

Referring to FIG. 1, a system and process flow diagram is provided which draws together in one overview the three systems illustrated in FIGS. 2-7.

In step 201, a user logs on to the Requisition and Catalog application (Req/Cat). His user profile determines the company group.

Figure 2:
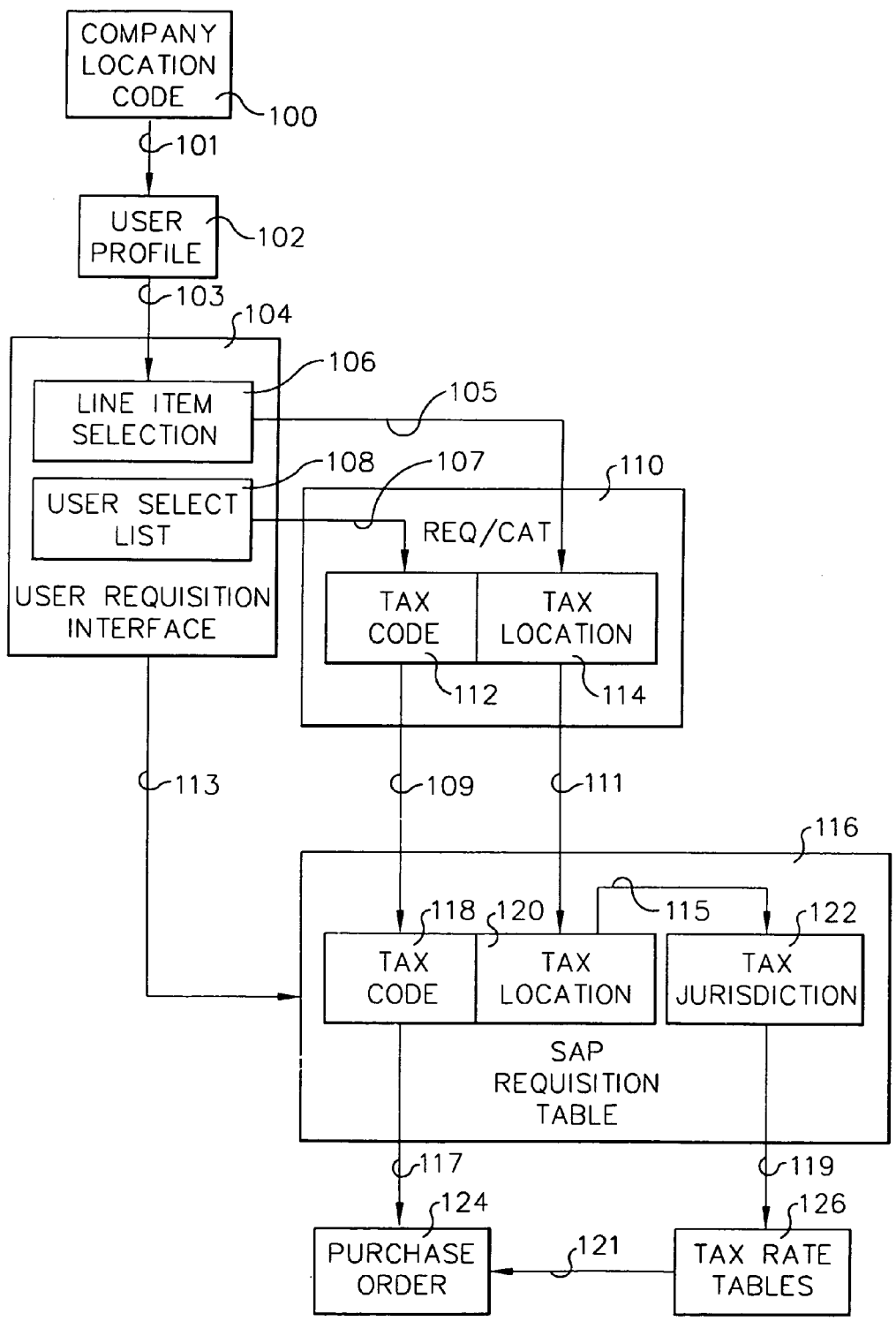
FIG. 2 is schematic representation of a process for preparing taxability for a purchase order in accordance with a scenario applicable to a first company group.

In step 203, users in group A use the tax process shown in FIG. 2. In step 205, users in group B use the tax process of FIG. 4. In step 207, users in group C use the tax process of FIG. 6.

In step 209, a Req/Cat requisition is created.

In step 211, the Req/Cat requisition is bridged to SAP, with the tax code and tax location sent to SAP. The tax location code is converted to a SAP tax jurisdiction code by the bridge. SAP is an acronym (derived from a German language phrase) which refers to an enterprise resource planning system, including an accounting application having an accounts payable function.

In step 213, the SAP requisition is created, and the tax information is stored in a requisition table.

In step 215, the purchase order is created using tax information from the requisition table.

In step 217, the invoice is received from the supplier.

Figure 3:
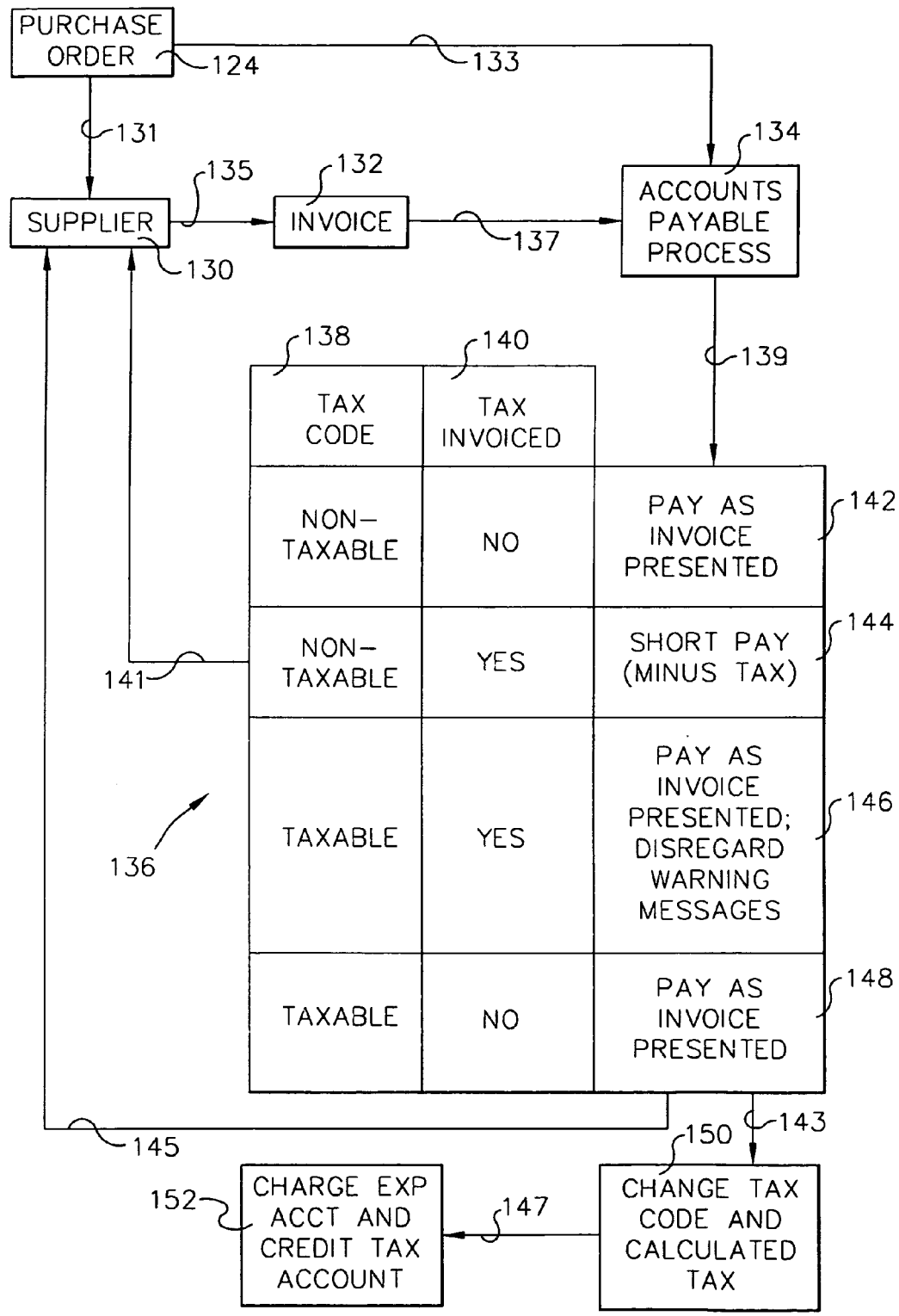
FIG. 3 is a schematic representation of a process for paying invoices for said first company group.
Figure 5:
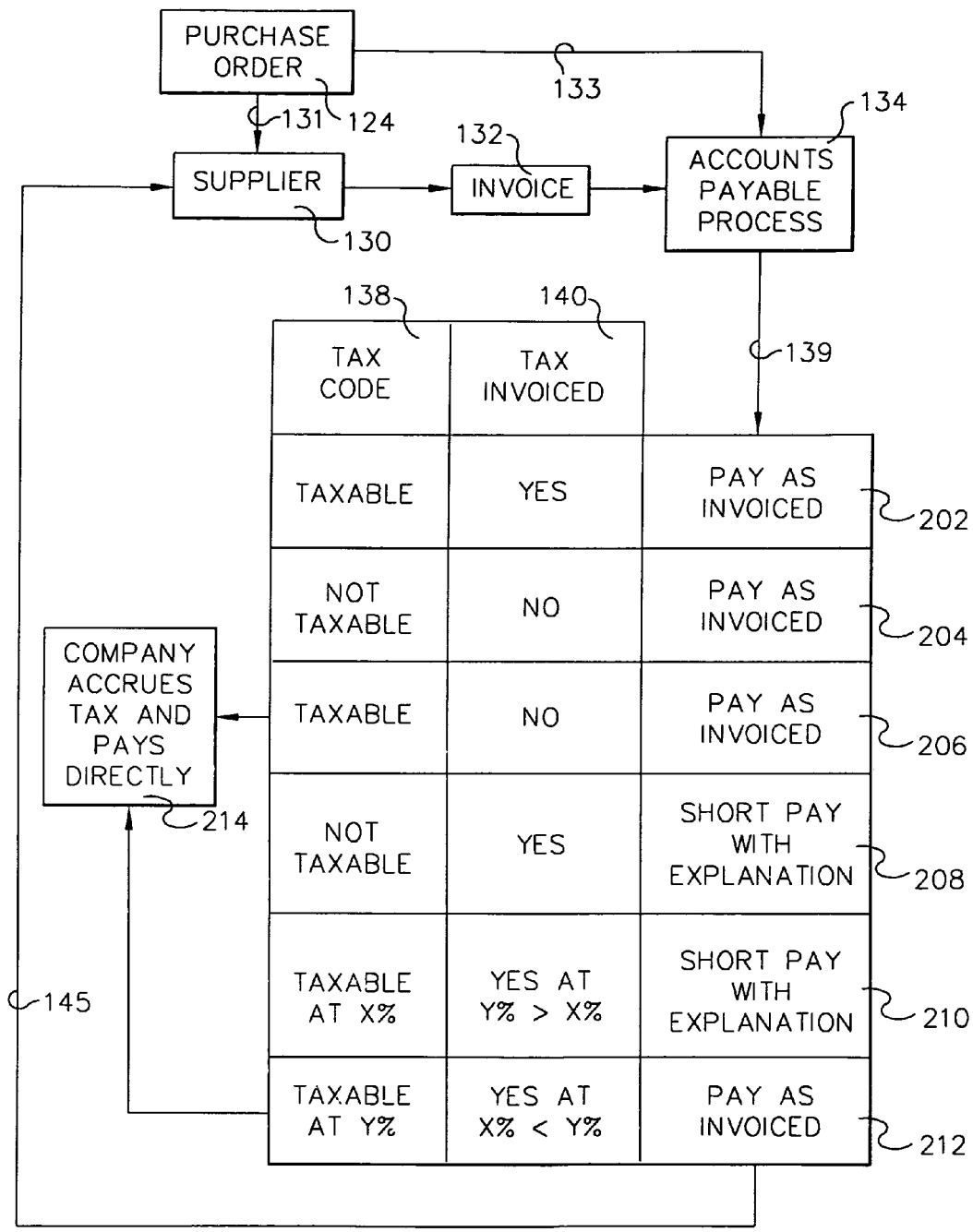
FIG. 5 is a schematic representation of a process for paying invoices for said second company group.
Figure 7:
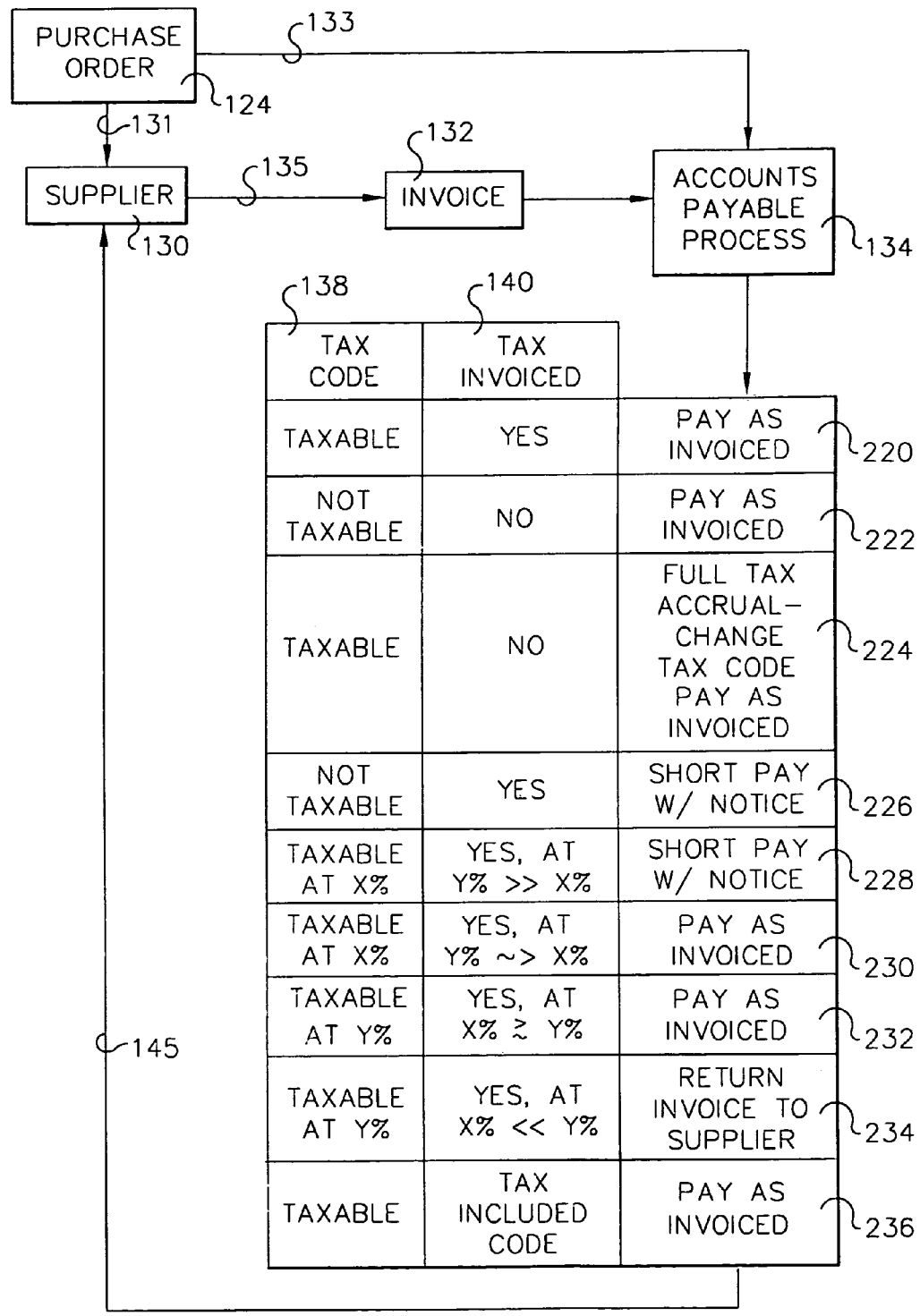
FIG. 7 is a schematic representation of a process for paying invoices for said third company group.

In step 219, invoices for companies in group A are processed as shown in FIG. 3. In step 221, invoices for companies in group B are processed as shown in FIG. 5. In step 223, invoices for companies in group C are processed as shown in FIG. 7.

User profiles contain a default tax location code for the user. This is derived from the user's plant code (a plant has an associated tax location code, based on its address). A user can edit his profile at any time and change this default tax location code.

When a user logs onto the front-end, he is associated with a user profile that has what company group and company he is in. (There is a feed from the HR system with this information, that guarantees the user is in the correct company group, as is more fully described in copending application S/N 09/815,318.) The business logic in the front-end then determines how much information the user must enter for taxes, based on his company group. In some cases, the user sees nothing—the system defaults to a tax code and location. In another company group, the user must select both. And in another, the user doesn't see anything—the tax approver must detemrine these fields.

FIG. 8 illustrates the display panel presented at the line item level to a user who is required to select tax code and tax location.

FIG. 9 represents the expansion of the "tax indicator code" of FIG. 8.

FIG. 10 illustrates the expansion of the "tax location code" of FIG. 8, and displays the list of tax location codes appropriate for the user's company.

Referring to FIG. 2, in accordance with the first scenario of this exemplary embodiment of the invention, a requester or user at the line item level in Req/Cat 110 determines taxability. There are two fields in Req/Cat 110 to make a tax determination.

First is the tax code field 112. The field tax code 112 defaults with the value "taxable". However, the user may choose a non taxable reason for the purchase from a drop down list 108 with which, as is represented by line 107, to override the default entry to tax code 112. In this embodiment, by way of example, tax codes available for user selection in list 108 include the following:

| | |
|---|---|
| I1 | Taxable |
| N1 | Nontaxable - Resale |
| N2 | Nontaxable - Manufacturing |
| N3 | Nontaxable - Research & Development |
| N4 | Nontaxable - Capital Improvement |
| N5 | Nontaxable - Service |
| N6 | Nontaxable - Other |

Second is the tax location field 114. As is represented by line 103 to line item selection 106 in user requisition interface 104, the field tax code 112 defaults in user profile 102 to the company location code 100. Location code 100 can be changed by user actuation at selection 106 according to the desired point for shipment of the goods, and as represented by line 105 this selection is fed to tax location field 114 in Req/Cat application 110.

The tax code 112 and tax location 114 are fed, as is represented by lines 109 and 111, respectively, to SAP requisition table 116. As is represented by line 115, the tax location field 120 is converted to a SAP tax jurisdiction code field 122. The tax code 118 and tax jurisdiction 122 for a given requisition 113 line in table 116 are used when the purchase order is created from the requisition. The tax code 118 and jurisdiction code 122 combination is maintained in SAP via a FTXP transaction. A periodic update spreadsheet is provide by the company to maintain the tax rates in table 126. A SAP purchase order contains the tax code 118 and tax jurisdiction code 122 as these are determined in Req/Cat 110. The purchase order output 124 contains a tax code 118 description, a jurisdiction code 122 description and the tax rate from table 126 corresponding to tax jurisdiction 122.

The tax code and tax location code from the front-end are passed to the back-end and stored in a table for each requisition line item. The 3-position tax location from the front-end is converted to a 9-digit tax jurisdiction code. For example, tax location 33F in the front-end is converted to tax jurisdiction 33F000000. Each tax code (ie I1, N1, N2 . . . etc) is maintained with each tax jurisdiction (ie 33I000000, 33F000000. . . ) to arrive at a rate in the back-end. The tax code and tax jurisdiction for the given requisition line is used when the purchase order is created from the requisition. A monthly update spreadsheet is provided by the companies to maintain the rates. The purchase order contains tax code/jurisdiction code as was determined in the front-end. The purchase order output contains the tax code description, the jurisdiction code description and the tax rate.

Referring to FIG. 3, purchase order 124 is sent to supplier 130 who fills the order and, as is represented by line 135, submits an invoice 132 for payment. As is represented by lines 133, 137 and 139, invoice 132 and purchase order 124 are utilized in an accounts payable process 134 and, as is represented by line 145, payment remitted back to supplier 130. The tax code 138 is obtained from purchase order 124, and the tax 140 amount invoiced is obtained from invoice 132 and utilized, as is represented by line 142, to determine processing subsequent to receipt of invoice 132.

At step 142, when purchase order 124 contains a nontaxable code 138 and invoice 132 contains no tax 140, the invoice is paid as presented by the supplier 130.

At step 144, when purchase order 133 contains a nontaxable code 138 and invoice 132 invoices tax 140, the invoice is short paid. That is, the invoiced amount less the tax is paid to the supplier, and as is represented by line 141 the supplier is notified via payment advice text that the invoice is paid short the tax.

At step 146, when purchase order 133 contains a taxable code 138 and invoice 132 contains tax 140, the invoice is paid as presented by supplier 130, and any warning messages from SAP that a different rate or amount was calculated from tax rates table 126 are ignored.

At step 148, when purchase order 133 contains a taxable code 138 and invoice 132 does not contain tax 140, the invoice is paid as presented by supplier 130. As is represented by line 143, the accounts payable representative, in this case, in step 150 will selected in the invoice verification procedure a calculate tax routine (such as by clicking on a tax calculation button in the invoice verification window), changing the tax code to UI in an invoice detail screen. In step 152, SAP will then calculate the tax, charging the expense account and crediting the tax account.

FIG. 11 illustrates a purchase order detail screen which shows tax code I1 which is a taxable code.

Figure 12:
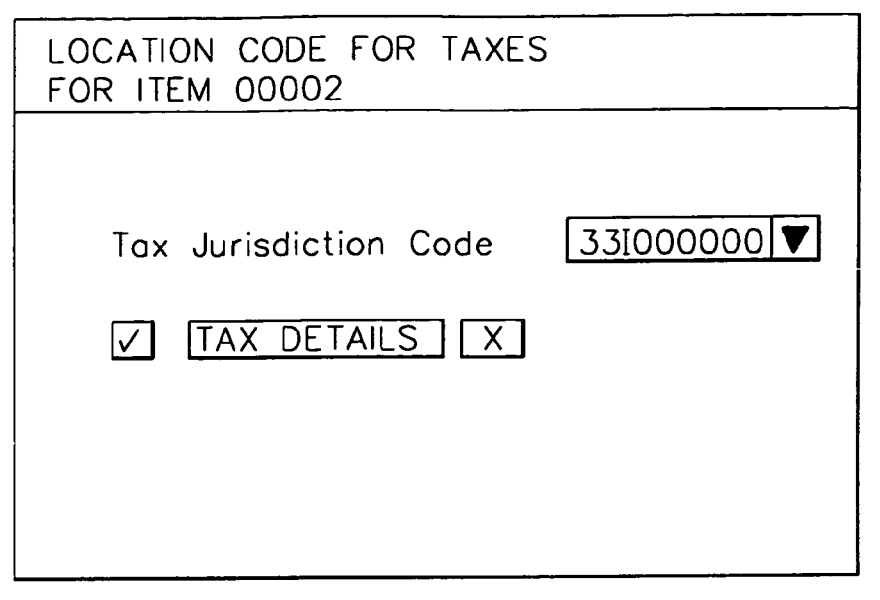

FIG. 12 illustrates a screen showing the tax jurisdiction code.

FIG. 13 illustrates an invoice verification screen showing a I1 tax code and a tax jurisdiction code of 33I000000 which have defaulted from the purchase order.

Figure 4A:
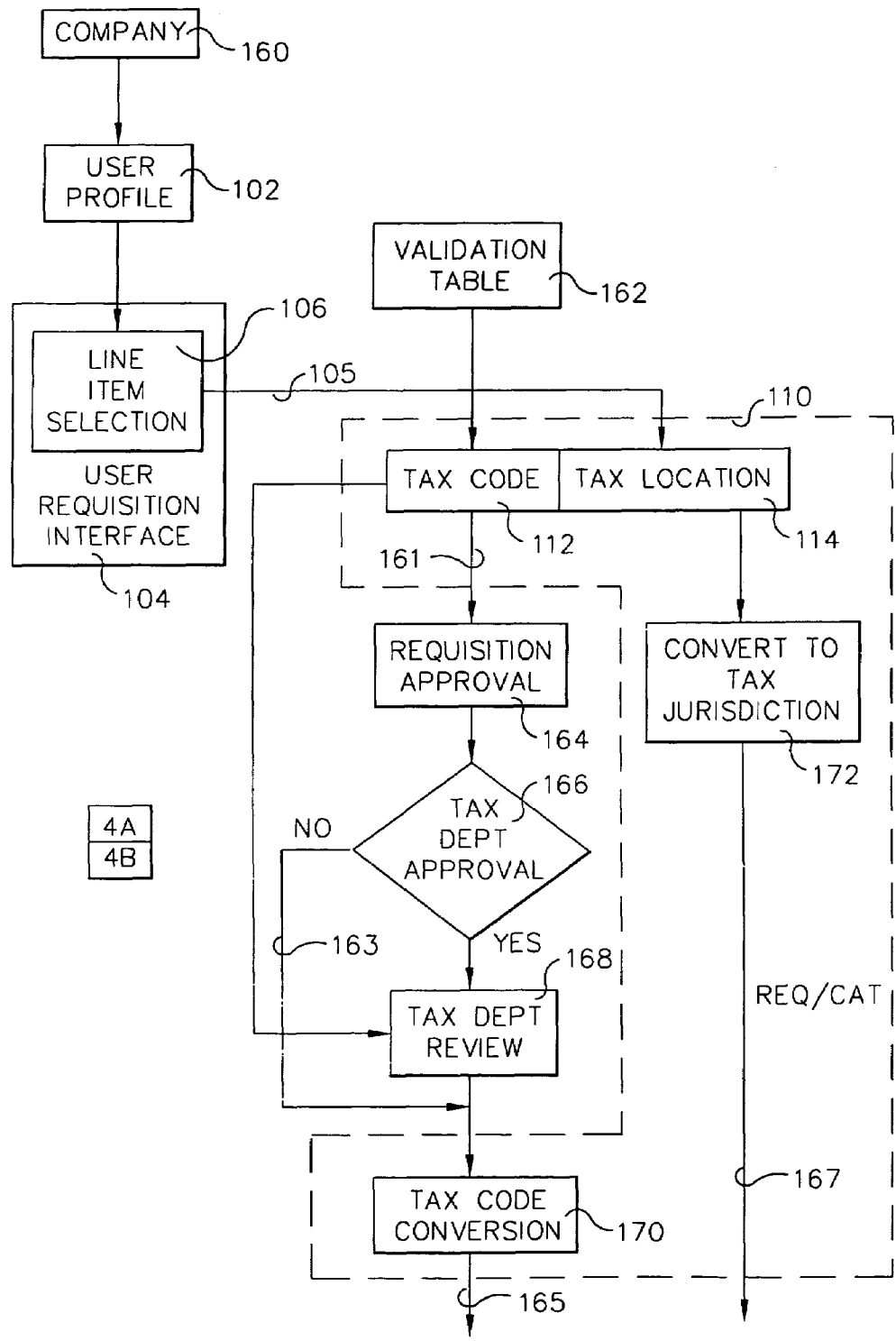
FIG. 4 is schematic representation of a process for preparing taxability for a purchase order in accordance with a scenario applicable to a second company group.
Figure 4B:
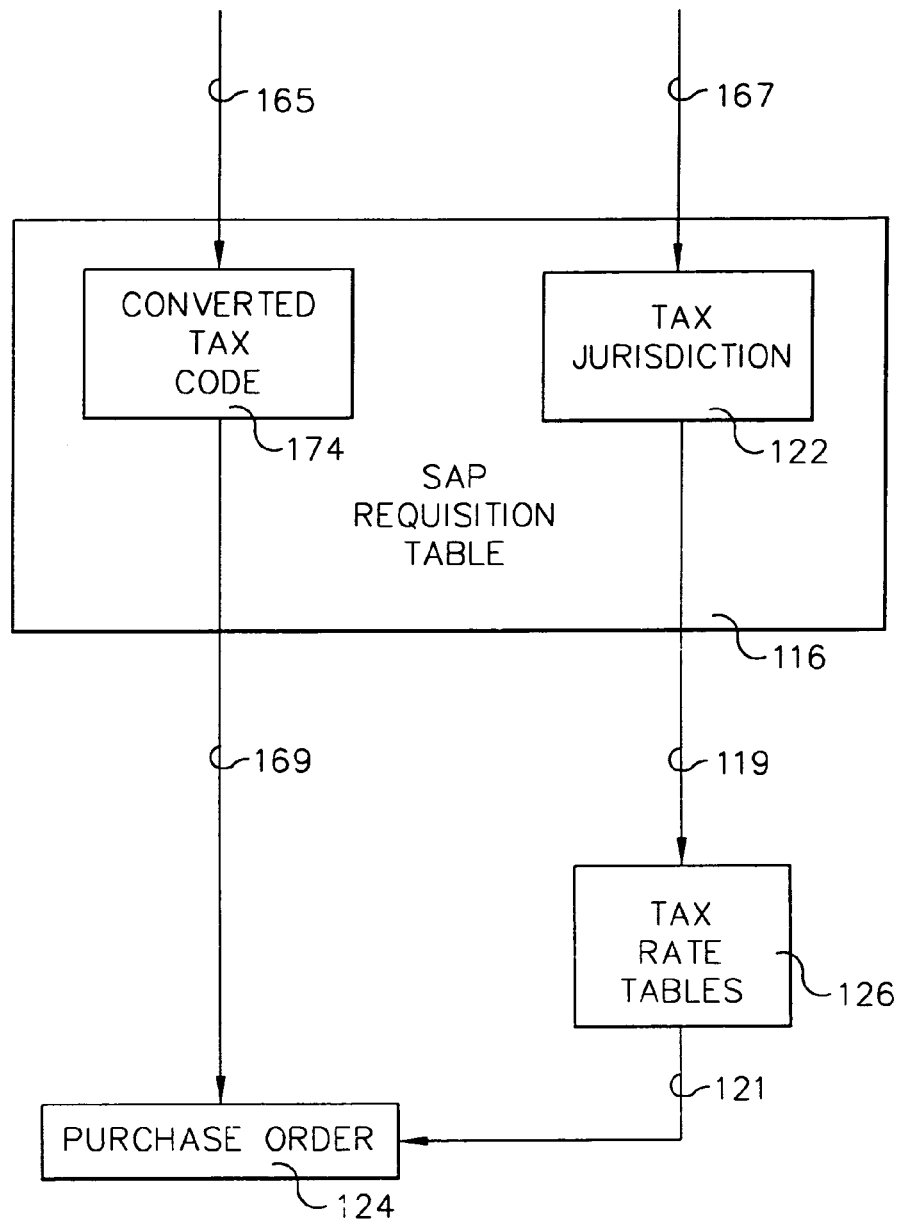

Referring to FIG. 4, in accordance with the second scenario of this exemplary embodiment of the invention, the user (or requester, the individual preparing or requesting preparation of a purchase order) is not involved in tax determination. Rather, tax determination is derived from the general ledger account for the item being purchased, and a tax department review is required for those buys of items for which the tax code 112 is X or blank.

The tax code for each general ledger (G/L) account is maintained in validation table 162 for companies in this company group 160. Tax codes 112 for this scenario are as follows:

| | |
|---|---|
| A | Taxable (other) |
| B | Taxable (repair and replace) |
| C | Taxable (reduced rate) |
| D | Taxable (computer services) |
| N | Not taxable (other) |
| R | Not taxable (resale) |
| X | Either taxable or non taxable |
| " " | (Blank) either taxable or non taxable |

An X or blank means that the tax determination cannot be made automatically. In this case, the requisition is sent for management approval and then held pending a review and determination of the correct tax code by the tax department.

A user from company 160 has a default tax location entered in his user profile 102 which will be displayed in line item tax location selection field 106 at interface 104 when requesting a purchase. The user may change the value for tax location. As is represented by line 105, the default or user selected tax location is entered to tax location field 114 in Req/Cat 110. However, tax code fields are hidden, or shown as non-changeable, at user requisition interface 104 for users in all companies in company group 160. In the tax department, this tax code is viewable and changeable by the tax approver.

Determination of the tax rate for a given object is determined by tax code 112 and tax location 114. Within Req/Cat 110, as is represented by line 167, tax location 114 is converted to tax jurisdiction 122 and stored in requisition table 116. As is represented by line 161, tax code 112 goes through a requisition approval process 164 which, in the event of an X or blank code 112 requires in steps 166 and 168 tax department review and determination of the applicable tax code.

Bridging from Req/Cat 110 to SAP 116 is then done. In step 170, the resulting tax code is converted to a SAP tax code and, as represented by line 165, stored in converted tax code field 174 in requisition table 116. In the event that in step 168 it is determined that the intended supplier is not registered to collect tax, the tax is accrued to the state (tax jurisdiction). Tax code conversion step 170 may be executed with respect to a tax code conversion table, such as illustrated in Table 1.

TABLE 1

TAX CODE CONVERSION TABLE

| Tax Code 112 | Converted Tax Code 174 | Description |
|---|---|---|
| A | A1 | Taxable - Other |
| B | B1 | Taxable - Repair & Replace |
| C | C1 | Taxable - Reduced Rate |
| D | D1 | Taxable - Computer Services |
| E | E2 | Taxable |
| F | F1 | Taxable |
| G | G1 | Taxable |
| H | H1 | Taxable |
| N | E1 | Non Taxable - Other |
| R | S1 | Non Taxable - Resale (may be out of scope) |

Note: if X or "" (blank) code, then fail in SAP.

As is represented by lines 119, 121 and 169, the purchase order 124 is created by line item from converted tax code 174, tax jurisdiction 122, and tax rate tables 126. An example output purchase order 124 may read: "I1 Taxable, Item subject to Tax CT—Connecticut 6%".

Referring to FIG. 5, for this second tax processing scenario, accounts payable process 134 will pay invoice 132 as provided by supplier 130 in step 202 when tax code 138 is taxable and tax is invoiced, in step 204 when tax code 138 is not taxable and no tax is invoiced, in step 206 when tax code 138 is taxable and no tax is invoiced, and in step 212 when tax code 138 indicates a tax rate less than the rate invoiced. In step 214, the company accrues and pays the tax directly. Accounts payable process 134 will short pay the invoice when, in step 208, tax code 138 is not taxable and tax is invoiced, and in step 210 when tax code 138 indicates that the tax rate is less than the tax invoiced 140.

Figure 6:
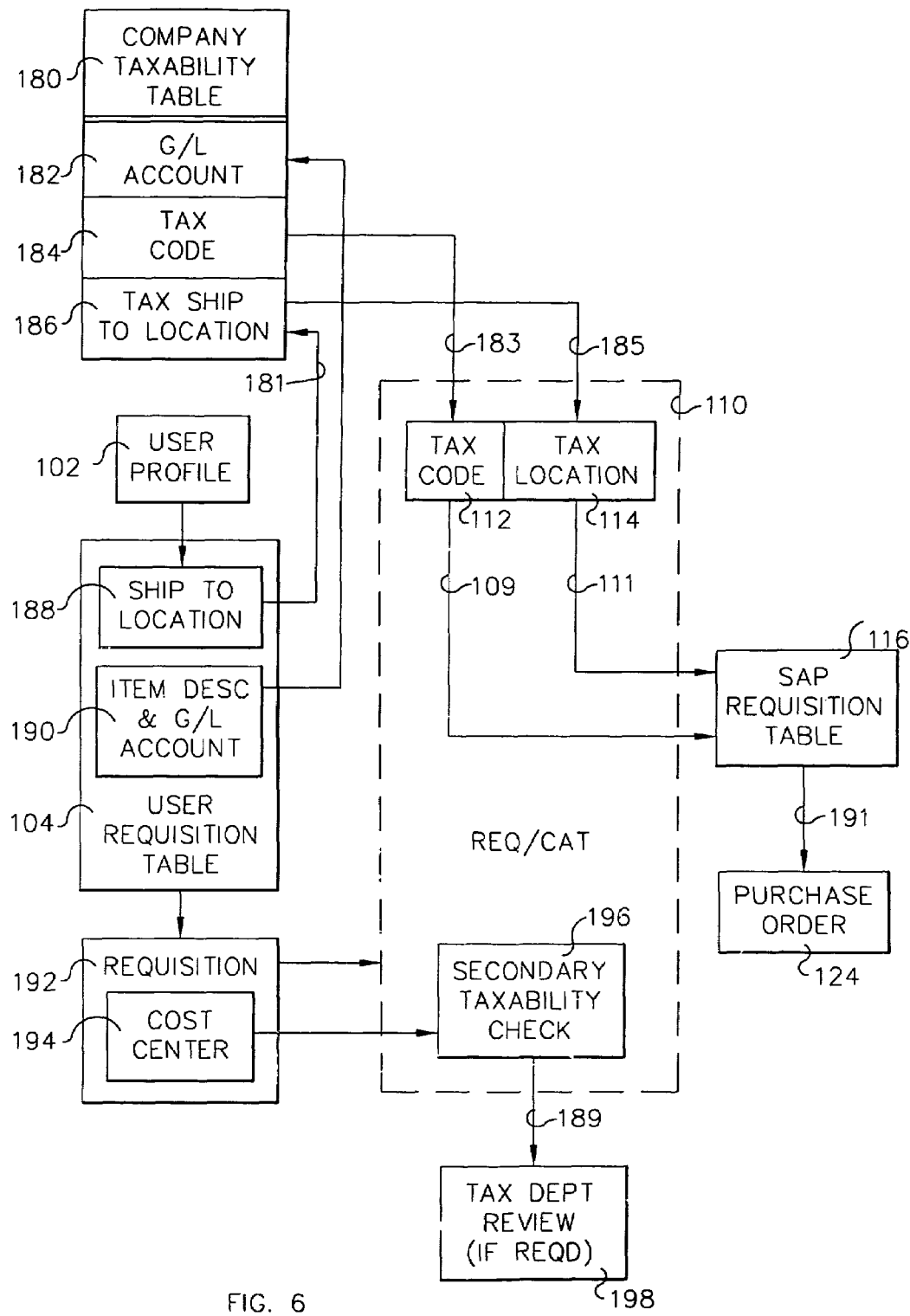
FIG. 6 is schematic representation of a process for preparing taxability for a purchase order in accordance with a scenario applicable to a third company group.

Referring to FIG. 6, in accordance with the third scenario of this exemplary embodiment of the invention, tax determination is made with reference to the commodity being purchases and the purchasing location (that is, the ship to location). In this process, the tax code is derived based on the general ledger account for the commodity or service being purchased, and the requester is allowed to enter the tax location code. The combination of tax code and tax location is then validated, and the cost center being charged is verified as a taxable cost center.

A company taxability table 180 is maintained for all companies in this company group which includes, for each general ledger account 182, the appropriate tax code 184 and tax ship to location 186. Table 2 illustrates a sample primary taxability table 180.

TABLE 2

SAMPLE COMPANY GROUP TAXABILITY TABLE 180

| G/L Account 182 | Tax Location CT1 | Tax Location CT2 |
|---|---|---|
| 021500000 | A1 | E1 |
| 017400000 | B1 | AB |

In this example, when a purchase is made using G/L account 021500000 and the requestor's tax ship to location is CT2, then the tax code E1 and tax location CT2 would be populated to Req/Cat 110 field 112 and 114, respectively. The combination of this tax code 184 and tax location 186 drive the taxability of the requisition line item 192. The tax code of AB in Table 2 represents that the taxable other code is applicable but other factors could make the purchase non-taxable. In that case, a secondary taxability check 196 needs to be performed.

In the example of Table 2, the tax codes 184 used for each tax location 186 code are as follows:

| | |
|---|---|
| A1 | Taxable - Other |
| AB | Could be either non taxable or taxable |
| B1 | Taxable - Repair and replace |
| BB | Could be either non taxable or taxable |
| C1 | Taxable - Reduced rate |
| CB | Could be either non taxable or taxable |
| D1 | Taxable - Computer services |
| DB | Could be either non taxable or taxable |
| E1 | Non taxable - Other |
| S1 | Non taxable - Resale |
| T1 | Tax included |
| "" | Route to tax approver to have tax code assigned |

When condition *B is encountered in primary taxability table 180, secondary check routine 196 is Req/Cat 110 will need to look at the cost center type 194 (also derived from table 180) to determine taxability.

User requisition interface 104 is initialized with a default ship to location from user profile 102 in field 188, which the user may accept or change. As is represented by lines 181 and 185, the tax ship to location selected or accepted is fed to Req/Cat 110 tax location field 114. At user requisition interface 104, the user selects from an item description and general ledger account pull down panel 190, the general ledger account number 182 for the desired purchase, and this issued to access table 180 to obtain the corresponding tax code which is then fed, as is represented by line 183, to tax code field 112 in Req/Cat 110. As in the preceding scenarios, tax code 112 and tax location 114 are converted and fed to requisition table 116, from which purchase order 124 is created.

A secondary taxability check is provided in this scenario to further define taxability. When the tax code 184 found in primary taxability table 180 ends with a B, for example, routine 196 determines taxability from the cost center type 194 contained in the requisition line item.

Referring to FIG. 7, for this third scenario, accounts payable process 134 executes with respect to invoice 132 received from supplier 130 against purchase order 124 as follows. The invoice 132 is paid as invoiced when, in step 220 it is determined that tax code 138 from purchase order 124 is taxable and tax 140 is invoiced; in step 222 when tax code 138 is not taxable and tax 140 is not invoiced; in steps 230 and 232 when tax code 138 indicates a tax rate which is within tolerance of the tax 140 invoiced; and in step 236 when tax code 138 is taxable and invoice 132 includes a tax included code

140. In step 224, when tax code 138 is taxable and no tax 140 is invoiced, the invoice is paid as provided by the supplier but the full tax amount is accrued. In step 226, when tax code 138 is not taxable and tax 140 is invoiced, or in step 228 when the tax 140 invoiced is more than a tolerance amount over the tax code 138, the invoice is short paid (that is, paid at the invoiced total amount less the tax or tax discrepancy, respectively). In step 234, the invoice is returned unpaid to the supplier 130 when tax 140 invoiced exceeds by some tolerance that rate applicable to tax code 138.

ADVANTAGES OVER THE PRIOR ART

It is an advantage of the invention that there is provided an improved system and method for processing tax payments.

It is a further advantage of the invention that there is provided a system and method for assigning taxability codes to purchases by company groups, and to automatically adapt to those company groups the processing of tax payments.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, P1/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method for assigning taxability codes to purchases and processing tax invoices, comprising the steps of:
    receiving from a user, identified by company indicia to one of a plurality of company groups including at least a first company group, a second company group, and a third company group, a purchase requisition selectively for at least one of a service and commodity line-item object;
    responsive to said indicia and said line-item object, determining in a front end process, a tax code and tax location based on defined business rules with said tax code selectively representing a line item as being one of a plurality of taxable, non-taxable, and undetermined tax codes and said tax location code selectively representing a default company location code and a ship-to location code for said line item;
    feeding said tax code and said tax location code to a back end process; and
    in said back end process, converting said tax code and tax location to a tax jurisdiction code with associated tax rate; and
    in said back end process, preparing a purchase order identified to said one of said plurality of company groups for transmittal to a supplier of said object;
    processing said purchase requisition for a user identified by company code to said first company group according to a first scenario in which a user creating a requisition selects taxability by selecting said tax code and said tax location code;
    processing said purchase requisition for a users identified by company code to said second company group according to a second scenario in which taxability is determined based on commodity purchased;
    processing said purchase requisitions for a user identified by company code to said third company group according to a third scenario in which taxability is determined based on commodity purchased and purchasing ship-to location;
    processing a first invoice submitted pursuant to said first scenario by paying said first invoice as presented when said purchase requisition contains a non-taxable code and said first invoice invoices no tax and when said purchase requisition contains a taxable code and said first invoice invoices tax; by short paying said first invoice when said purchase requisition contains a non-taxable code and said first invoice invoices tax; and by paying said first invoice as presented and crediting a tax account for tax when said purchase requisition contains a taxable code and said first invoice invoices no tax;
    processing a second invoice submitted pursuant to said second scenario by paying said second invoice as presented when said purchase requisition contains a non-taxable code and said second invoice invoices no tax, when said purchase requisition contains a taxable code and said second invoice invoices tax, and when said purchase requisition contains a taxable code and said second invoice invoices no tax; by short paying said second invoice when said purchase requisition contains a non-taxable code and said second invoice invoices tax and when said purchase requisition contains a taxable code at a first tax rate and said second invoice invoices tax a tax rate more than said first tax rate; and by paying said second invoice as presented and crediting a tax account for tax when said purchase requisition contains a taxable code at a second tax rate and said second invoice invoices tax at a tax rate less than said second tax rate; and
    processing a third invoice submitted pursuant to said third scenario by paying said third invoice as presented when said purchase requisition contains a non-taxable code and said third invoice invoices no tax, and when said purchase requisition contains a taxable code and said third invoice invoices tax; by short paying said third invoice when said purchase requisition contains a non-taxable code and said third invoice invoices tax and when said purchase requisition contains a taxable code at a first tax rate and said third invoice invoices tax a tax rate more than said first tax rate; by paying said third invoice as presented when said purchase requisition contains a taxable code at a second tax rate and said third invoice invoices tax at a tax rate within tolerance of said second tax rate; by paying said third invoice as presented and crediting a tax account when said purchase requisition contains a taxable code and said third invoice invoices no tax.

2. The method of claim 1, further comprising the steps of:
    receiving an invoice from said supplier, said invoice selectively including a tax field;

responsive to said tax field, and to said company group and tax code indicia from said purchase order, processing said invoice and said tax field to selectively pay, short pay, or reject said invoice.

3. The method of claim 1, further comprising the step of:
pursuant to said first scenario, receiving from said user tax code indicia and tax location indicia, thereby involving said user in defining taxability for said object based on defined business rules.

4. The method of claim 1, further comprising the steps of:
pursuant to said second scenario, providing for each prospective object, a corresponding tax code; and
defining taxability for said object in said requisition with reference to said corresponding tax code and said tax location.

5. The method of claim 1, further comprising the steps of:
pursuant to said third scenario, maintaining in a taxability table for each general ledger account a corresponding tax code and tax ship to location;
responsive to user selection of said object, obtaining from said taxability table said tax code and said tax location; and
defining taxability for said object in said requisition with reference to said corresponding tax code and tax ship to location.

6. A system for assigning taxability codes to line-item purchases and processing tax invoices, comprising:
a user requisition interface for receiving from a user, identified by company indicia to one of a plurality of company groups including at least a first company group, a second company group, and a third company group, a purchase requisition for a service or commodity line-item object;
a front end processor;
a back end processor;
said front end processor being responsive to said indicia and said line-item object for determining a tax code and tax location code, and for converting said tax code into a converted tax code and said tax location code into a tax jurisdiction for each line-item object of said tax invoice, said tax code selectively representing a line item as being one of a plurality of taxable, non-taxable, and undetermined tax codes and said tax location code selectively representing a company location code and a ship-to location code for said line item;
said front end processor processing said purchase requisition for a user identified by company code to said first company group according to a first scenario in which a user creating a requisition selects taxability by selecting said tax code and said tax location code;
said front end processor processing said purchase requisition for a users identified by company code to said second company group according to a second scenario in which taxability is determined based on commodity purchased;
said front end processor processing said purchase requisitions for a user identified by company code to said third company group according to a third scenario in which taxability is determined based on commodity purchased and purchasing ship-to location;
said back end process being responsive to said converted tax code, said tax jurisdiction, said preparing and said company indicia for preparing a purchase order identified to said one of said plurality of company groups for transmittal to a supplier of said object.

7. The system of claim 6, further comprising:
said back end being responsive to an invoice from said supplier selectively including a tax field and to said company group and tax code indicia from said purchase order for processing said invoice and said tax field to selectively pay, short pay, or reject said invoice.

8. The system of claim 6, further comprising:
said front end processor receiving from said user tax code indicia and tax location indicia, thereby involving said user in defining taxability for said object.

9. The system of claim 6, further comprising:
a data store for providing for each prospective object, a corresponding tax code; and
said front end processor further defining taxability for said object in said requisition with reference to said corresponding tax code and said tax location.

10. The system of claim 6, further comprising:
a taxability table for storing for each general ledger account a corresponding tax code and tax ship to location;
said front end processor further responsive to user selection of said object for obtaining from said taxability table said tax code and said tax location and for defining taxability for said object in said requisition with reference to said corresponding tax code and tax ship to location.

11. A program storage device readable by a machine, tangibly embodying a program of instructions executable by a machine to perform method steps for assigning taxability codes to purchases and processing tax invoices, said method steps comprising:
receiving from a user, identified by company indicia to one of a plurality of company groups including at least a first company group, a second company group, and a third company group, a purchase requisition selectively for at least one of a service and commodity line-item object;
responsive to said indicia and said line-item object, determining in a front end process, a tax code and tax location code, said tax code selectively representing a line item as being one of a plurality of taxable, non-taxable, and undetermined tax codes and said tax location code selectively representing a company location code and a ship-to location code for said line item;
in said front process, converting said tax code into a converted tax code and said tax location into a tax jurisdiction;
feeding said converted tax code and said tax jurisdiction to a back end process;
in said back end process, preparing a purchase order identified to said one of said plurality of company groups for transmittal to a supplier of said line-item object;
in said front end process processing said purchase requisition for a user identified by company code to said first company group according to a first scenario in which a user creating a requisition selects taxability by selecting said tax code and said tax location code;
in said front end process processing said purchase requisition for a users identified by company code to said second company group according to a second scenario in which taxability is determined based on commodity purchased;
in said front end process processing said purchase requisitions for a user identified by company code to said third company group according to a third scenario in which taxability is determined based on commodity purchased and purchasing ship-to location;

in said back end process processing a first invoice submitted pursuant to said first scenario by paying said first invoice as presented when said purchase requisition contains a non-taxable code and said first invoice invoices no tax and when said purchase requisition contains a taxable code and said first invoice invoices tax; by short paying said first invoice when said purchase requisition contains a non-taxable code and said first invoice invoices tax; and by paying said first invoice as presented and crediting a tax account for tax when said purchase requisition contains a taxable code and said first invoice invoices no tax;

in said back end process processing a second invoice submitted pursuant to said second scenario by paying said second invoice as presented when said purchase requisition contains a non-taxable code and said second invoice invoices no tax, when said purchase requisition contains a taxable code and said second invoice invoices tax, and when said purchase requisition contains a taxable code and said second invoice invoices no tax; by short paying said second invoice when said purchase requisition contains a non-taxable code and said second invoice invoices tax and when said purchase requisition contains a taxable code at a first tax rate and said second invoice invoices tax a tax rate more than said first tax rate; and by paying said second invoice as presented and crediting a tax account for tax when said purchase requisition contains a taxable code at a second tax rate and said second invoice invoices tax at a tax rate less than said second tax rate; and in said back end process processing a third invoice submitted pursuant to said third scenario by paying said third invoice as presented when said purchase requisition contains a non-taxable code and said third invoice invoices no tax, and when said purchase requisition contains a taxable code and said third invoice invoices tax; by short paying said third invoice when said purchase requisition contains a non-taxable code and said third invoice invoices tax and when said purchase requisition contains a taxable code at a first tax rate and said third invoice invoices tax a tax rate more than said first tax rate; by paying said third invoice as presented when said purchase requisition contains a taxable code at a second tax rate and said third invoice invoices tax at a tax rate within tolerance of said second tax rate; by paying said third invoice as presented and crediting a tax account when said purchase requisition contains a taxable code and said third invoice invoices no tax.

12. A computer program product for assigning taxability codes to purchases and processing tax invoices comprising:
   a computer readable medium;
   first program instructions for receiving from a user, identified by company indicia to one of a plurality of company groups including at least a first company group, a second company group, and a third company group, a purchase requisition including at least one line item for a service or commodity line-item object;
   second program instructions, responsive to said indicia and said object, for determining in a front end process, a tax code and tax location code for each said line item object said tax code selectively representing a line item as being one of a plurality of taxable, non-taxable, and undetermined tax codes and said tax location code selectively representing a company location code and a ship-to location code for said line item;
   third program instructions in said front end process for converting said tax code into a converted tax code and said tax location code into a tax jurisdiction code;
   fourth program instructions for feeding said converted tax code and said tax jurisdiction to a back end process;
   fifth program instruction in said back end process for preparing a purchase order identified to said one of said plurality of company groups for transmittal to a supplier of said object;
   sixth program instructions for processing said purchase requisition for a user identified by company code to said first company group according to a first scenario in which a user creating a requisition selects taxability by selecting said tax code and said tax location code;
   seventh program instructions for processing said purchase requisition for a users identified by company code to said second company group according to a second scenario in which taxability is determined based on commodity purchased;
   eighth program instructions for processing said purchase requisitions for a user identified by company code to said third company group according to a third scenario in which taxability is determined based on commodity purchased and purchasing ship-to location; and wherein
   said first, second, third, fourth, fifth, sixth, seventh and eighth program instructions are recorded on said computer readable medium.

* * * * *